Dec. 16, 1958     R. A. RUSCETTA ET AL     2,864,982
ELECTRIC CAPACITOR
Filed Dec. 17, 1952

Inventors.
Ralph A. Ruscett
Raymond N. Dalton,
by Prowell S. Nack
Their Attorney.

United States Patent Office 2,864,982
Patented Dec. 16, 1958

2,864,982

ELECTRIC CAPACITOR

Ralph A. Ruscetta, Glens Falls, and Raymond Neil Dalton, Hudson Falls, N. Y., assignors to General Electric Company, a corporation of New York Application December 17, 1952, Serial No. 326,404

5 Claims. (Cl. 317—258)

The present invention relates to electrical capacitors. More particularly, it relates to a new and improved electrical capacitor particularly characterized by a high insulation resistance and a long voltage life.

The improved capacitors embodying the present invention comprise cooperating armatures held in spaced relationship by a plurality of interposed sheets of dielectric material, at least one sheet being a porous paper having a thickness usually not substantially exceeding about .0005" and at least one sheet being composed of the plastic or resinous material obtained by polymerizing glycol esters of terephthalic acid. In addition, the assembly of capacitor armatures and dielectric spacing material is impregnated with a liquid or resinous solid impregnating material for a further improvement of the dielectric efficiency of the capacitor.

It has been found that liquid-filled capacitors comprising a composite dielectric spacing material consisting of at least one sheet of paper and at least one sheet of the polymeric terephthalic polyester have substantially higher insulation resistance and substantially longer life at applied voltages than conventional capacitors in which the spacing material consists only of paper. Further, the liquid-impregnated combination of paper and specified plastic film results in a capacitor having a lower power factor at elevated temperatures, a higher corona starting voltage, and a flatter capacitance-temperature curve than a corresponding impregnated capacitor containing only the terephthalate ester film as the spacer dielectric. Capacitors containing the composite dielectric of the present invention when impregnated with any of the usual resinous impregnants of the solventless varnish type have a higher insulation resistance and will withstand thermal shock much more effectively than similarly impregnated all-paper dielectric capacitors.

Figure 1:
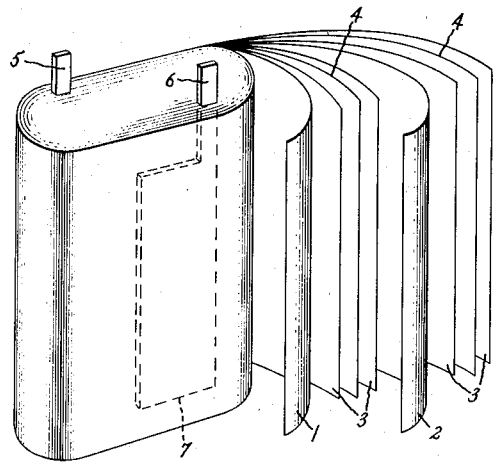
Figure 2:
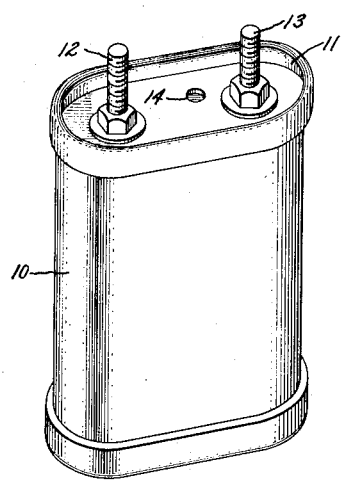

While the invention is not restricted to any particular form of the capacitor, it will, for convenience, be described with reference to the well-known rolled type capacitor. In the accompanying drawing, Fig. 1 is a perspective view of a partially uncoiled rolled capacitor assembly and Fig. 2 shows externally a capacitor of the type shown in Fig. 1 after being encased in a metal container.

The capacitors of the present invention are constructed in the usual manner except for the dielectric spacing material employed. Thus, as shown in Fig. 1 of the drawing, the assembly may be made by winding strips 1 and 2 of metal foil such as aluminum, copper, tantalum, etc., with an interleaved dielectric or spacing material comprising a plurality of sheets, at least one of which is paper and at least one of which is the polymeric terephthalic polyester. In the embodiment shown in the drawing, this spacing material comprises two sheets of paper 3 and an intervening sheet of the terephthalic polyester film 4 with the sheets of paper comprising this composite dielectric in direct contact with the armatures. While this is believed to be the preferred arrangement for the spacing material, the invention is not restricted thereto. The presence of at least one sheet of paper in the composite dielectric spacer aids in the subsequent impregnation of the capacitor assembly and preferably, if only one sheet of paper is employed, it should be in contact with one of the armature members 1 or 2.

Electrical contact with the armatures may be made by laid-in tap straps 5 and 6 having their ends protruding from one end of the rolled capacitor assembly. The tap straps may be welded to the armatures if desired to obtain a better contact and the lower part of the straps 5 and 6 may be enlarged as at 7 to provide a larger contact area with its cooperating armature.

Although considerable latitude is permissible in the choice of the paper component of the dielectric spacing material, linen or kraft capacitor papers having a thickness not greater than about one mil and preferably about 0.3 mil are preferred.

The resinous film or sheet 4 is composed of the resinous product described in Patent 2,465,319—Whinfield et al. The resin is a linear, highly polymerized ester of terephthalic acid and a polymethylene glycol, such as ethylene glycol, trimethylene glycol, hexamethylene glycol or the like, containing from two to about ten carbon atoms. Preferably, the plastic film is composed of a high molecular weight polymeric polyester obtained by reacting ethylene glycol with terephthalic acid in such proportions that about at least one molecular proportion of the glycol is present relative to the terephthalic acid. Films composed of this resinous material can be obtained as thin as about .00025". They are tough, resistant to many chemicals and stable at temperatures somewhat about 150° C. These films are unusually free from conducting particles such as are present in the usual capacitor papers and, hence, are particularly suited for use as part of the spacing dielectric. Both as regards their thermal and chemical stability, films of the polymethylene terephthalate resin are superior to other resinous films previously employed as capacitor dielectrics including those of cellulose acetate, polystyrene and the like.

Prior to impregnation, the composite armature-spacer assembly is usually placed in a metal container such as the container 10 shown in Fig. 2 and the cover 11 hermetically sealed on to the container. Before the cover is sealed on to the container the contact tap straps 5 and 6 are respectively affixed to the terminals 12 and 13 extending through and insulated from the cover 11. In order to allow withdrawal of moisture from the assembly and the introduction of the impregnating material, a small hole 14 is provided in the cover 11.

Before impregnation, the capacitor assemblies are normally vacuum dried to remove residual moisture. The drying temperature will vary depending on the length of the drying cycle, but usually ranges from about 60 to 150° C. With too low a temperature the drying period is excessively long while too high a temperature may cause decomposition of the paper component of the dielectric spacer.

The impregnating material in liquid form is admitted to the capacitor assembly through the hole 14 while the dried assembly is still under vacuum. Enough of the impregnating material is introduced completely to fill the container. The pressure is then raised to atmospheric pressure and the assembly allowed to stand to permit thorough penetration of the liquid impregnant.

After impregnation, the capacitor unit may be sealed by applying a quantity of a suitable solder to the hole 14. If the impregnant is a polymerizable resinous material, the capacitor assembly is thereafter heated to an elevated temperature to effect polymerization and solidification of that material.

Any of the well-known liquid or resinifiable impregnating materials may be employed. Examples of suitable impregnants which remain liquid during the life of the capacitor are mineral oil, cottonseed oil, various silicone oils, i. e., liquid high molecular weight organopolysiloxanes containing approximately two organo groups per silicon atom, polymerized butenes, and any of the various halogenated aromatic hydrocarbon compounds. Examples of the halogenated aromatic compounds are the chlorinated diphenyls, the chlorinated diphenyl ketones, pentachloronitrodiphenyl and its alkyl derivatives, chlorinated benzene and benzene derivatives, and the like.

The resinifiable impregnants which may be employed are the so-called solventless varnish type which permit the introduction of the impregnant into the capacitor in the form of a liquid and the subsequent in situ conversion thereof to a solid state without the liberation of water or any gaseous material. Examples of the solventless varnish impregnants are styrene, solutions of polymeric styrene in monomeric styrene, solutions of polyalpha-methylstyrene in monomeric styrene with or without addition of small amounts of divinyl benzene, polyisobutylene and resins, liquid polymerized diallyl phthalate resins. All of these solventless varnishes are characterized by the fact that all of the components, with the possible exception of any curing agents or accelerators which may be present in small amounts, contain polymerizable components, i. e., organic compounds containing [—CH=CH$_2$] radicals, such as vinyl or allyl radicals, by means of which the impregnant can be converted to the solid state without the evolution of any aqueous or gaseous by-products. A preferred resinous impregnant is composed, by weight, of from 25 to 55 percent of a liquid polyalpha-methylstyrene, from 45 to 65 percent monomeric styrene, and from about 0.5 to 10 percent divinyl benzene. This polymerizable composition is preferred for its temperature resistance and its thermosetting characteristics.

At temperatures of 85° C. and above, capacitors embodying the combination spacing material of the present invention possess extraordinary stability which surpasses that of the well-known capacitors containing only paper as a spacing material. A number of capacitors were made up containing a dielectric spacer composed of one sheet of the terephthalic acid ester polymer obtained by reaction of ethylene glycol with terephthalic acid and two sheets of kraft paper. The terephthalic ester sheet having a thickness of .00025" was sandwiched between the two sheets of kraft paper, each of which had a thickness of .0004". Some of the capacitors were tested without impregnation and others were impregnated with various well-known liquid or fluid impregnating materials.

Representative units of each type were tested for corona starting voltage. In the case of the untreated capacitor, the corona starting voltage was 420 volts while the same type capacitor impregnated with mineral oil had a corona starting voltage of 1200 volts. A capacitor impregnated with cottonseed oil had a corona starting voltage of 1900 volts.

Capacitor units of this same series were also subjected to accelerated life tests at an impressed voltage of 1000 volts D.-C. and at a temperature of 125° C. During this test, the capacitors were periodically tested at 25° C. and 125° C. and the results of these tests are set forth in Table I.

*Table I*

[Spacer 2 sheets paper—1 sheet polymer—total thickness 1.05 mils]

| Impregnant | Time (Hours) | Mfd. Capacity | | Percent Power Factor, 125° C. | 125° C. Insulation Resistance (Meg.× Mfd.) |
|---|---|---|---|---|---|
| | | 25° C. | 125° C. | | |
| None | 0 | .679 | .734 | .64 | 51.8 |
| | 3,194 | .690 | .735 | .52 | 102 |
| Mineral oil | 0 | 1.04 | 1.06 | .74 | 53 |
| | 3,194 | 1.03 | 1.10 | 1.84 | 27 |
| | 6,034 | 1.03 | 1.09 | 2.88 | 43 |
| Methyl Silicone oil | 0 | 1.13 | 1.12 | .75 | 63 |
| | 935 | 1.12 | 1.14 | .85 | 51 |
| Cottonseed oil | 0 | 1.17 | 1.17 | .84 | 19.7 |
| | 935 | 1.17 | 1.17 | 1.85 | 24 |

The capacity and power factor values were measured at 60 cycles and 110 volts. The insulation resistance values were measured after application of 500 volts D.-C. for one minute and are specified in terms of the capacity multiplied by the insulation resistance of the dielectric spacer (impregnated or not impregnated).

During the life tests of the two untreated capacitors tested, one failed at 1164 hours and the other at 5817 hours for an average of 3490 hours. In the case of the mineral oil impregnated capacitors, one failed at 3133 hours, one at 6925 hours, and the third unit was still operating at 7300 hours. One of the two cottonseed oil impregnated capacitors failed at 1812 hours and the second at 2729 hours for an average of 2270 hours. The silicone oil impregnated capacitors both failed below 1400 hours with an average life of 1200 hours. This life is about ten times that obtained with all-paper spaced capacitors impregnated with the same silicone oil.

In the second series of tests to determine the effect of the paper component of the spacer element, a plurality of capacitors in which the spacer consisted only of two sheets of the terephthalate polyester polymer having a total spacer thickness of 1 mil were subjected to the same life tests with impressed voltage of 1000 volts D. C. The results of these tests are set forth in Table II.

*Table II*

[Spacer—2 sheets resin polymer—total thickness 1 mil.]

| Impregnant | Time (Hours) | Mfd. Capacity | | Percent Power Factor, 125° C. | 125° C. Insulation Resistance (Meg.× Mfd.) |
|---|---|---|---|---|---|
| | | 25° C. | 125° C. | | |
| None | 0 | .405 | .453 | 1.5 | 756 |
| | 6,034 | .391 | .420 | 1.14 | 4,080 |
| Mineral oil | 0 | .430 | .478 | 1.52 | 189 |
| | 6,034 | .395 | .437 | 2.17 | 1,410 |
| Silicone oil | 0 | .445 | .490 | 1.56 | 273 |
| | 6,034 | .398 | .426 | 1.23 | 2,060 |

While these capacitors had high insulation resistances, the corona starting voltages for the liquid-filled capacitors of this series were consistently lower than those obtained with the liquid-filled capacitors containing the combination paper-polyester spacer, the highest value in this series being 900 volts which was obtained with the mineral oil-filled capacitor containing two sheets of polyester film. Noting the capacity values, it will be observed that in the capacitors of Table II, the increase in capacity between 25° C. and 125° C. is about 10 percent in all cases whereas the impregnated capacitors of Table I containing paper as part of the spacer material exhibited practically no change in capacity with change in temperature. Further, the capacitors containing only the resin films as spacers exhibited a continued drop in capacitance during the life tests while the capacities of the impregnated capacitors of Table I remained substantially unchanged.

The advantages of capacitors embodying the present invention will become particularly apparent when they are compared with the usual impregnated capacitors containing a plurality of sheets of kraft paper as the sole dielectric spacing material. From the life tests at 125° C. and 1000 volts D. C. on such capacitors as set forth in Table III, it will be seen that the paper-spaced capacitors all show a marked decrease in insulation resistance and an increase in power factor with time on test.

*Table III*

[Spacer—3 sheets paper totaling 1.2 mils.]

| Impregnant | Time | Mfd. Capacity, 125° C. | Percent Power Factor, 125° C. | 125° C. Insulation Resistance (Meg.× Mfd.) |
|---|---|---|---|---|
| Mineral oil | 0 | .72 | .43 | 51 |
|  | 2,171 | .80 | 4.3 | 18 |
|  | 3,151 | .82 | 6.8 | 4.7 |
| Cottonseed oil | 0 | .83 | .51 | 9.9 |
|  | 2,164 | 1.05 | 9.5 | 2.4 |
| 75% Pentachlorodiphenyl and 25% Trichlorobenzene | 0 | 1.00 | .70 | 7.9 |

During this series of tests (Table III) the mineral oil capacitor units, of which three were tested, respectively failed at 2046 hours, 2263 hours, and 2503 hours, for an average of 2271 hours. Of the three cottonseed oil impregnated units, one failed at 3136 hours while two were still satisfactory at 4700 hours. The units impregnated with the pentachlorodiphenyl-trichlorobenzene mixture all failed in less than 200 hours at an average life of 169 hours for three units whereas a capacitor containing a spacer composed of a sheet of the terephthalate polyester sandwiched between two sheets of a paper impregnated with the same mixture had a life of 1010 hours.

Resin impregnated capacitors in which the spacer is at least one sheet of paper and one sheet of the terephthalate polyester resin are outstanding in their resistance to thermal shock, i. e., the resistance to thermal-cycling between elevated and subnormal temperatures without failure. For example, the usual resin impregnated capacitors in which the spacer is a plurality of sheets of paper fail dielectrically at test voltage, i. e., at voltages 125 percent above rated voltage, after being subjected to from 1 to 10 cycles between minus 55° C. and plus 85° C. On the other hand, in the same tests resin impregnated capacitors containing the combination of paper and terephthalate polymer as the spacer, or only a terephthalate polymer spacer, will withstand at least 50 such cycles. This characteristic of the capacitors of the present invention is particularly advantageous with resins or any impregnating material having a high pour point, that is, any impregnant which is solid at room temperature or below.

A particularly useful capacitor of the resin impregnated type is one containing one or two sheets of paper and one sheet of the terephthalate resin film as a spacer impregnated with the in situ polymerization product of a mixture of styrene, liquid polyalpha-methylstyrene and divinylbenzene. These three ingredients are preferably employed in the proportions of about 56 percent, by weight, of the styrene monomer, 41.5 percent of the liquid polyalpha-methylstyrene, and about 2.5 percent of the divinylbenzene. As is pointed out hereinbefore, the liquid material, which is essentially a solution of the polyalpha-methylstyrene polymer in the monomeric styrene and divinylbenzene, is introduced into the capacitor, after which the capacitor is heated to an elevated temperature to effect the polymerization of the materials. Capacitors of this type containing as a spacer one sheet of the resin film between two sheets of kraft paper when tested at 125° C. have a capacity of about 2.4 microfarads, a power factor of about .82 percent and an insulation resistance (megohm microfarads of about 290). They are extremely thermal-shock resistant and will consistently withstand at least 50 cycles between a minus 55 and a plus 85° C. without failure.

From the foregoing description, it will be seen that there have been provided in accordance with this invention, stable capacitors having a high insulation resistance, a long life and other desirable properties not found in the conventional fixed dielectric capacitors.

What we claim as new and desire to secure by Letters Patent of the United States is:

1. An electric capacitor comprising cooperating armatures, an interposed dielectric spacer consisting of a sheet of a polymethylene terephthalate resin sandwiched between two sheets of paper, said dielectric spacer being impregnated with a dielectric material filling the voids in said capacitor.

2. An electric capacitor comprising cooperating armatures, an interposed dielectric spacer consisting of a sheet composed of polyethylene terephthalate sandwiched between two sheets of paper, said dielectric spacer being impregnated with a dielectric material filling the voids in said capacitor.

3. An electric capacitor comprising cooperating armatures, an interposed dielectric spacer consisting of a sheet composed of polyethylene terephthalate sandwiched between two sheets of paper, said dielectric spacer being impregnated with a dielectric material filling the voids in said capacitor, said dielectric material being composed of a polymerized mixture of styrene, polyalpha-methylstyrene and divinyl benzene.

4. An electric capacitor comprising cooperating armatures, an interposed dielectric spacer consisting of a sheet of polymethylene terephthalate resin sandwiched between two sheets of paper, said dielectric spacer being impregnated with a dielectric material filling the voids in said capacitor, said dielectric material being composed of a polymerized mixture of styrene, polyalpha-methylstyrene and divinyl benzene.

5. An electrical capacitor comprising metal electrode elements and an interposed complex dielectric spacer, said dielectric spacer comprising a plurality of layers of paper and polyethylene terephthalate film, said film sandwiched between layers of said paper, said complex dielectric spacer impregnated with a dielectric material which fills the voids in the capacitor.

References Cited in the file of this patent

UNITED STATES PATENTS

| | | |
|---|---|---|
| 1,688,478 | Weiss | Oct. 23, 1928 |
| 1,736,764 | Schecker | Nov. 19, 1929 |
| 2,307,488 | Clark | Jan. 5, 1943 |
| 2,497,376 | Swallow | Feb. 14, 1950 |
| 2,634,315 | Allison | Apr. 7, 1953 |
| 2,665,400 | Walker | Jan. 5, 1954 |
| 2,740,732 | Peck | Apr. 3, 1956 |